(12) United States Patent  
Niimi

(10) Patent No.: US 8,095,125 B2  
(45) Date of Patent: Jan. 10, 2012

(54) MOBILE TERMINAL, OPERATION CONTROL PROGRAM, AND DATA ACCESS CONTROL PROGRAM

(75) Inventor: Tomohiro Niimi, Tachikawa (JP)

(73) Assignee: Casio Hitachi Mobile Communications Co., Ltd., Tokyo (JP)

(*) Notice: Subject to any disclaimer, the term of this patent is extended or adjusted under 35 U.S.C. 154(b) by 591 days.

(21) Appl. No.: 11/703,395

(22) Filed: Feb. 7, 2007

(65) Prior Publication Data

US 2007/0201682 A1  Aug. 30, 2007

(30) Foreign Application Priority Data

Feb. 16, 2006 (JP) ................................. 2006-038724

(51) Int. Cl.  
*H04M 3/00* (2006.01)

(52) U.S. Cl. ...................... 455/418; 455/414.1; 455/551

(58) Field of Classification Search .................. None  
See application file for complete search history.

(56) References Cited

U.S. PATENT DOCUMENTS

| | | | | |
|---|---|---|---|---|
| 5,675,630 A | * | 10/1997 | Beatty ........................... | 455/551 |
| 5,950,138 A | * | 9/1999 | Norimatsu .................... | 455/551 |
| 6,154,660 A | * | 11/2000 | Singh ............................ | 455/564 |
| 6,195,558 B1 | * | 2/2001 | Griffith et al. ............. | 455/456.5 |
| 6,574,467 B1 | * | 6/2003 | Jonsson ...................... | 455/414.1 |
| 7,376,445 B2 | | 5/2008 | Nakayama | |
| 2006/0234693 A1 | * | 10/2006 | Isidore et al. .............. | 455/422.1 |
| 2007/0099638 A1 | * | 5/2007 | Voltz ............................. | 455/500 |

FOREIGN PATENT DOCUMENTS

| | | |
|---|---|---|
| CN | 1681281 | 10/2005 |
| JP | 08-167936 | 6/1996 |
| JP | 11-136761 | 5/1999 |
| JP | 2003-304184 | 10/2003 |
| JP | 2005-333184 | 12/2005 |
| JP | 2006-031458 | 2/2006 |
| WO | WO 2005/120120 | 12/2005 |

* cited by examiner

*Primary Examiner* — Erika Gary  
(74) *Attorney, Agent, or Firm* — Cozen O'Connor

(57) ABSTRACT

In a cellular phone, when a coming-to-the-office signal is detected by a non-contact IC section, a CPU selects an official mode as a telephone number mode. Meanwhile, when a leaving-the-office signal is detected by the non-contact IC section, the CPU selects a private mode as a telephone number mode. In an application menu, applications usable and not usable in the current telephone number mode are displayed according to the availability mode added for the applications so that a user can identify these applications. Only the files corresponding with the current telephone number mode can be selected according to the mode identifier added for the file, or the type of the folder storing the file. Thereby, a plurality of processing functions included in the cellular phone, or many files stored therein can be automatically used selectively either on official use or on private use.

10 Claims, 9 Drawing Sheets

| MODE | TELEPHONE NUMBER |
|---|---|
| OFFICIAL MODE | 090-XXX-XXXX |
| PRIVATE MODE | 080-XXX-XXXX |

FIG.10
FIG.10A
OFFICIAL MODE
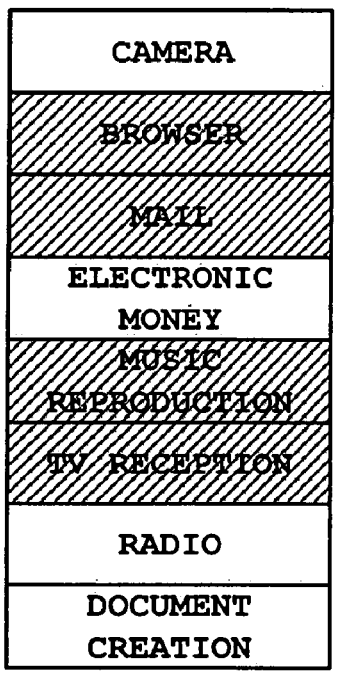
FIG.10B
PRIVATE MODE
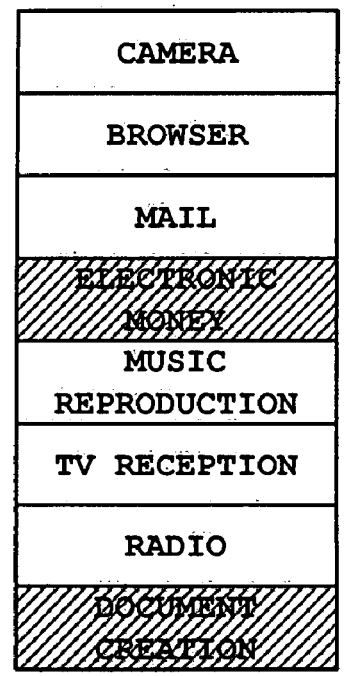
FIG.10C
MESSAGE DISPLAY
UNABLE TO START THE APPLICATION!

MOBILE TERMINAL, OPERATION CONTROL PROGRAM, AND DATA ACCESS CONTROL PROGRAM

CROSS-REFERENCE TO RELATED APPLICATION

This application is based upon and claims the benefit of priority from the prior Japanese Patent Application No. 2006-038724, filed Feb. 16, 2006, the entire contents of which are incorporated herein by reference.

BACKGROUND OF THE INVENTION

1. Field of the Invention

The present invention relates to a mobile terminal executing various functions including communication, an operation control program, and a data access control program.

2. Description of the Related Art

In recent years, cellular phones have been added with functions other than communication functions (telephone and mail transmission/reception functions) including telephone calls. That is, for example, various functions such as a camera function, a music reproduction function, a television reception function, and an electronic money function are added thereto. Such Various functions have dazzled people. In general, the respective functions are all in a state of being available. However, it is possible to limit part or all of the operations of the functions by operating a specific limitation function.

For example, there is a technology in which a plurality of telephone numbers are provided, telephone call limitation conditions (area, time of day, and other-party telephone number) are set for each telephone number, and limitation is put on telephone calls beyond the telephone call limitation conditions (for example, refer to Japanese Laid-Open Patent Publication No. 8-167936). Further, for example, there is a technology in which the electronic money function is able to be used only when a password is successfully verified, or a technology in which a theft state is detected to disable all functions (for example, refer to Japanese Laid-Open Patent Publication No. 2005-333184).

The foregoing specific limitation function operates according to user's intention or presence of receiving a specific signal.

However, in the case that the limitation function does not operate, it becomes possible to use functions not directly related to business affairs such as the camera function, the music reproduction function, and the television reception function, even when the cellular phone is used on company business, that is, even when the cellular phone is used in business hours. This is not preferable since this leads to mixing up personal affairs and official ones.

Meanwhile, the camera function provided for a cellular phone may be used on official use. In this case, it is not possible to determine whether the photographing is made on official use or on private use. Therefore, even when the photographing is made on official use and the stored photographing image file is to be referred to on company business, it is difficult to use the stored image file since the stored image file is mixed up with other photographing image files which are photographed on private use. This is problematic, since this leads to mixing up personal affairs and official ones.

Much the same is true on a file created as a report to a company with the use of a document creation function, or a file (documents or charts on official use) downloaded from the company. Even when a cellular phone is used on private use, the company file can be easily opened, for example. That is, there is therein a security problem.

SUMMARY OF THE INVENTION

In accordance with an aspect of the present invention, there is provided a mobile terminal which stores a plurality of telephone numbers corresponding to a plurality of telephone number modes, and executes communication by a telephone number corresponding to a telephone number mode selected from the plurality of telephone number modes including a telephone number mode selection means for selecting one of the plurality of telephone number modes, a plurality of processing means for executing given processing other than the communication with corresponding availability limitation information which indicates whether or not the processing is available according to each of the plurality of telephone number modes, and an execution availability determination means for determining execution availability of each of the plurality of processing means based on the telephone number mode selected by the telephone number mode selection means and the availability limitation information corresponding to the plurality of processing means.

In accordance with another aspect of the present invention, there is provided a mobile terminal which stores a plurality of telephone numbers corresponding to a plurality of telephone number modes, and executes communication by a telephone number corresponding to a telephone number mode selected from the plurality of telephone number modes including a telephone number mode selection means for selecting one of the plurality of telephone number modes, a memory means for storing a plurality of data corresponding to the one of the plurality of telephone number modes, and an accessibility determination means for determining accessibility to each of the plurality of data based on whether or not a telephone number mode corresponding to each of the plurality of data corresponds with the telephone number mode selected by the telephone number mode selection means.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 10A and 10B show an example of displaying an application menu in the cellular phone 100 according to this embodiment; and FIG. 10C is a diagram showing an example of a message.

DETAILED DESCRIPTION OF THE PREFERRED EMBODIMENT

The present invention will hereinafter be described in detail with reference to the preferred embodiment shown in the accompanying drawings.

A. Structure of the Embodiment

Figure 1:
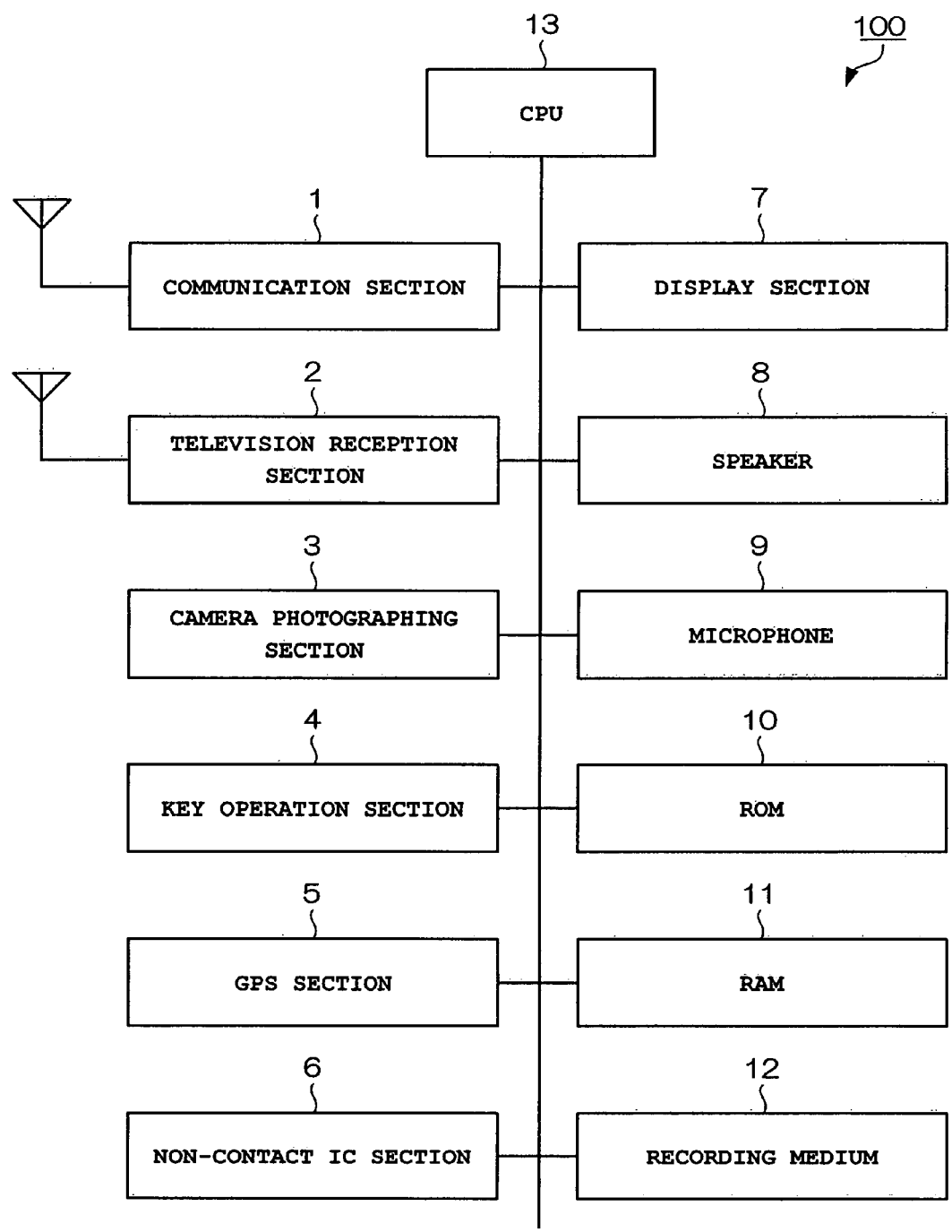
FIG. 1 is a block diagram showing a structure of a cellular phone according to an embodiment of the invention.

FIG. 1 is a block diagram showing a structure of a cellular phone (mobile terminal) according to an embodiment of the invention. In the figure, a communication section 1 performs telephone calls and data communication by controlling outgoing/incoming calls or signals via an unshown wireless base station. A television reception section 2 receives a television signal corresponding to a desired channel from a broadcast signal received by an antenna (commonly referred to as 1 segment, which is short for 1 segment broadcasting service), and receives radio broadcasting. A camera photographing section 3 captures an image formed in an image pickup device such as a CCD via an optical system (lens or the like). A key operation section 4 is an input section for inputting a telephone number and other information. The key operation section 4 is used when a user gives input to the cellular phone, for example, when the user turns ON/OFF the power of a cellular phone 100, when the user starts various applications, and when the user directs photographing by the camera photographing section 3.

Figures 2, 3:
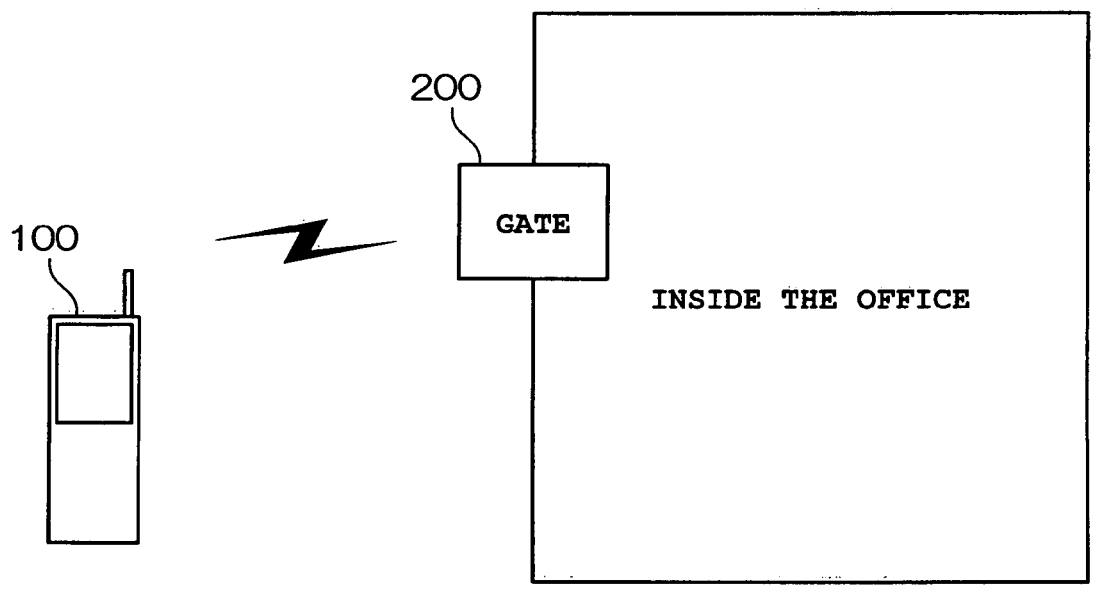
FIG. 2 is a conceptual diagram showing an example of switching between official mode and private mode of the cellular phone according to this embodiment.
FIG. 3 is a conceptual diagram showing telephone numbers selectively usable either on official use or on private use in the cellular phone according to this embodiment.

A GPS section 5 receives an electric wave from a plurality of satellites, and obtains its current position (latitude, longitude and the like) according to the reception time difference. As shown in FIG. 2, a non-contact IC section 6 is started when the user comes very close to a gate 200 when the user comes to the office and the like or the user leaves the office, and detects that the user passes the gate 200. When detection is made that the user enters the office from outside, an aftermentioned CPU 13 determines that the user comes to the office and sets the cellular phone 100 to official mode. Meanwhile, when detection is made that the user goes out from the office, the CPU 13 determines that the user leaves the office and sets the cellular phone 100 to private mode. Then, personal authentication is also made.

The foregoing GPS section 5 may be used as a substitute for the foregoing non-contact IC section 6, or may be used in combination with the foregoing non-contact IC section 6. For example, position information such as a place away from the office on business and a place of a business trip where the non-contact IC section 6 is not usable is previously registered. The current position obtained by the GPS section 5 is compared to the registered position information. Then, when judgment is made that the user is in the official place, the official mode may be selected.

A display section 7 (display means) is composed of, for example an LCD (Liquid Crystal Display) or an organic EL (Electroluminescence). For example, the display section 7 displays a power state, an electric wave strength, a battery remaining amount, an operation state such as a server connection state and unread mails, an inputted telephone number, a mail destination, a mail transmission document, a moving image and a static image, a caller telephone number of an incoming call, an incoming mail document, and a reception data such as a page on the Internet connected thereto. Further, the display section 7 shows a display necessary for using functions of the cellular phone 100.

A speaker 8 outputs sound data included in a television signal, music data, sound of other party in a telephone call and the like. A microphone 9 inputs user sound in a telephone call. A ROM 10 (memory means) stores the foregoing given programs, various parameters and the like. The ROM 10 stores at least 2 telephone numbers as shown in FIG. 3. One is a telephone number used in the public mode (for example, 090-xxx-xxxx), and the other is a telephone number used in the private mode (for example, 080-xxx-xxxx).

Figure 4:
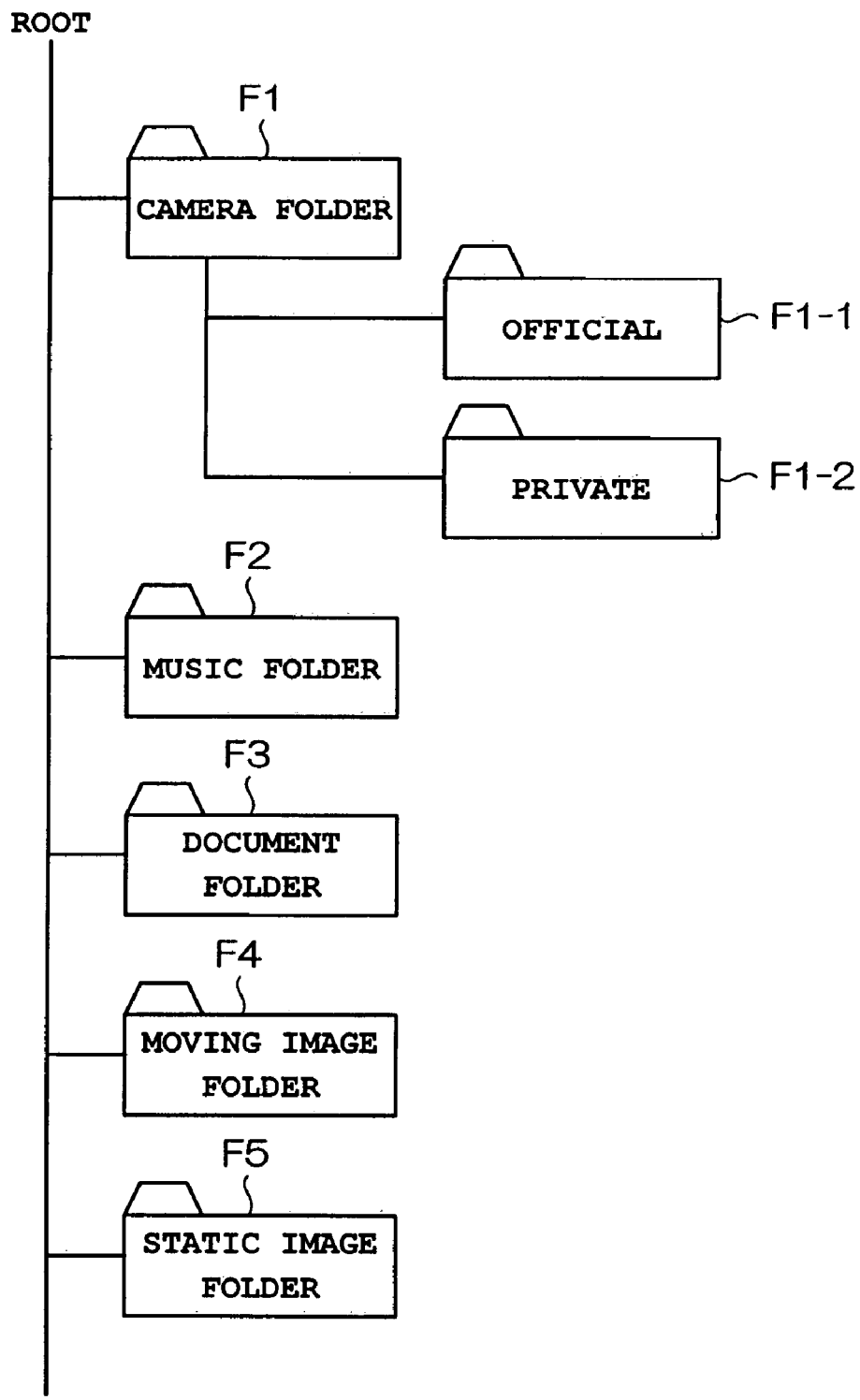
FIG. 4 is a conceptual diagram for explaining a data management method in the cellular phone according to this embodiment.

A RAM 11 stores various information such as photographing image data which is photographed by the camera photographing section 3, document data and music data which is created by a document creation function, downloaded from the communication section 1 via a network, or transmitted from a personal computer. The RAM 11 is provided with folders for managing data for each type of data to be stored as shown in FIG. 4. As an illustration in FIG. 4, a camera folder F1, a music folder F2, a document folder F3, a moving image folder F4, and a static image folder F5 are provided.

Further, the camera folder F1 is provided with an official folder F1-1 and a private folder F1-2. When the cellular phone 100 is used in the official mode, photographed image data is stored in the official folder F1-1, and image files stored in the official folder F1-1 can be read. Meanwhile, when the cellular phone 100 is used in the private mode, photographed image data is stored in the private folder F1-2, and image files stored in the private folder F1-2 can be read.

Further, files stored in the music folder F2, the document folder F3, the moving image folder F4, and the static image folder F5 are stored being added with a telephone number mode at this point, that is, a mode identifier indicating the official mode or the private mode after these files are downloaded. When the data stored in these folders is read, reading is enabled only when the added mode identifier corresponds with the telephone number mode at this point. A recording medium 12 is composed of, for example, a removable miniSD card. The recording medium 12 is managed similarly to the foregoing RAM 11, and may store various data. In addition, the recording medium 12 can be handled equally to the RAM 11.

Further, in this embodiment, to process the foregoing various data, a plurality of applications corresponding to each data format thereof are stored in the ROM 10 or the RAM 11. Each application is previously added with an availability mode indicating whether the application is usable in the telephone number mode of the official mode or in the telephone mode of the private mode. When an application menu for selecting the application to be started is displayed, the availability mode is used to display the application menu so that the user can identify which application is available in the current telephone number mode.

The CPU 13 controls operations of the cellular phone 100 according to given programs. In particular, in this embodiment, the CPU 13 controls switching telephone number modes (official mode or private mode) according to the detection signal of the non-contact IC section 6, controls displaying the application menu according to the telephone number mode, controls starting and operating the applications, controls reading various files stored in the foregoing respective folders, controls operations of the camera photographing section 3, and controls download operation of the various files by the communication section 1.

The CPU 13 realizes each function of a telephone number mode selection means, a plurality of processing means for executing given processing other than the communication, an execution availability determination means, a display control means, an extraction means, a detection means, a mode switch means; the memory means, an accessibility determination means, and a mode matching means.

B. Operation of the Embodiment

B-1. Main Operations

Figure 5:
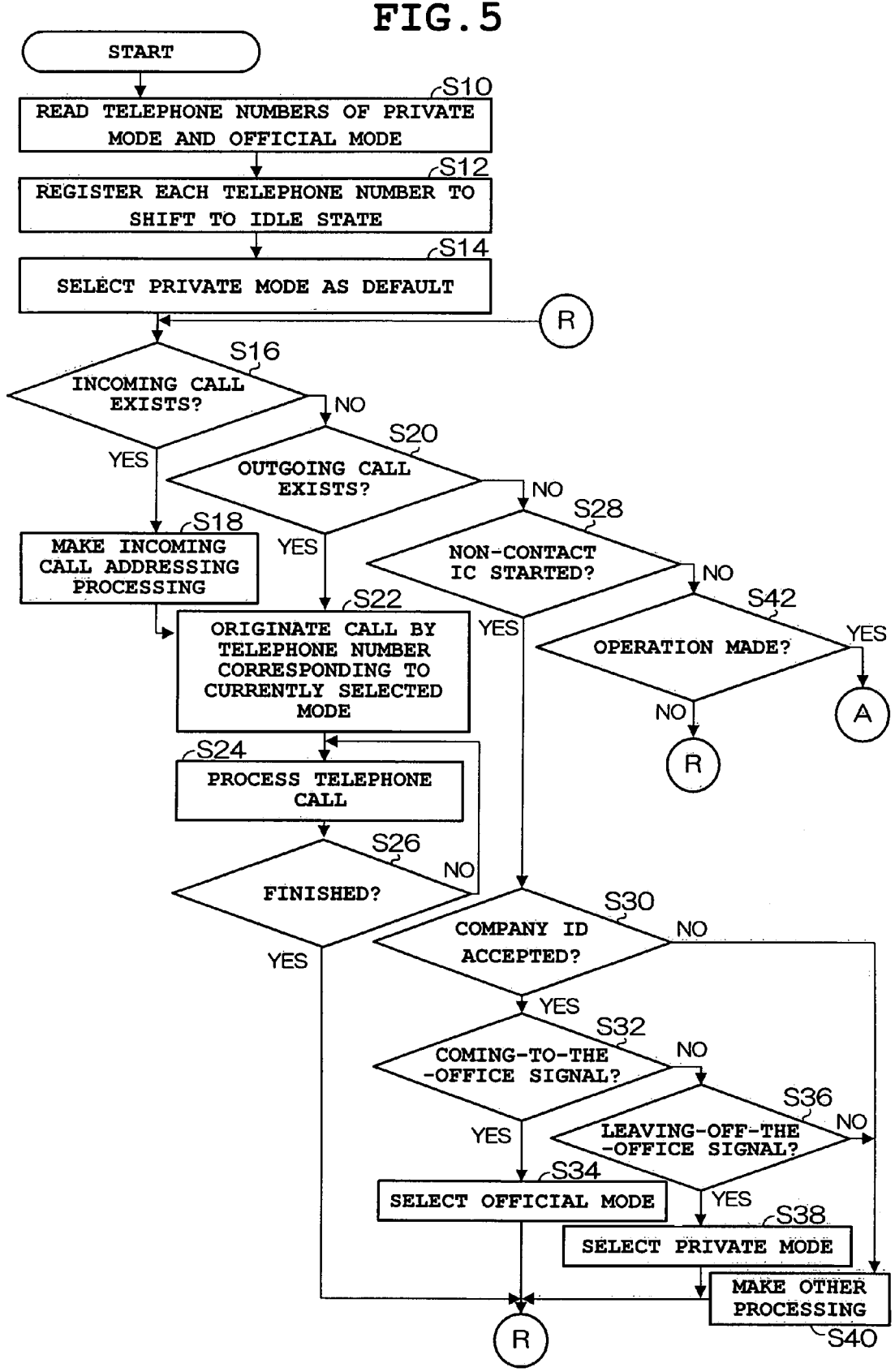
FIG. 5 is a flowchart for explaining operations of a cellular phone 100 according to this embodiment.
Figure 6:
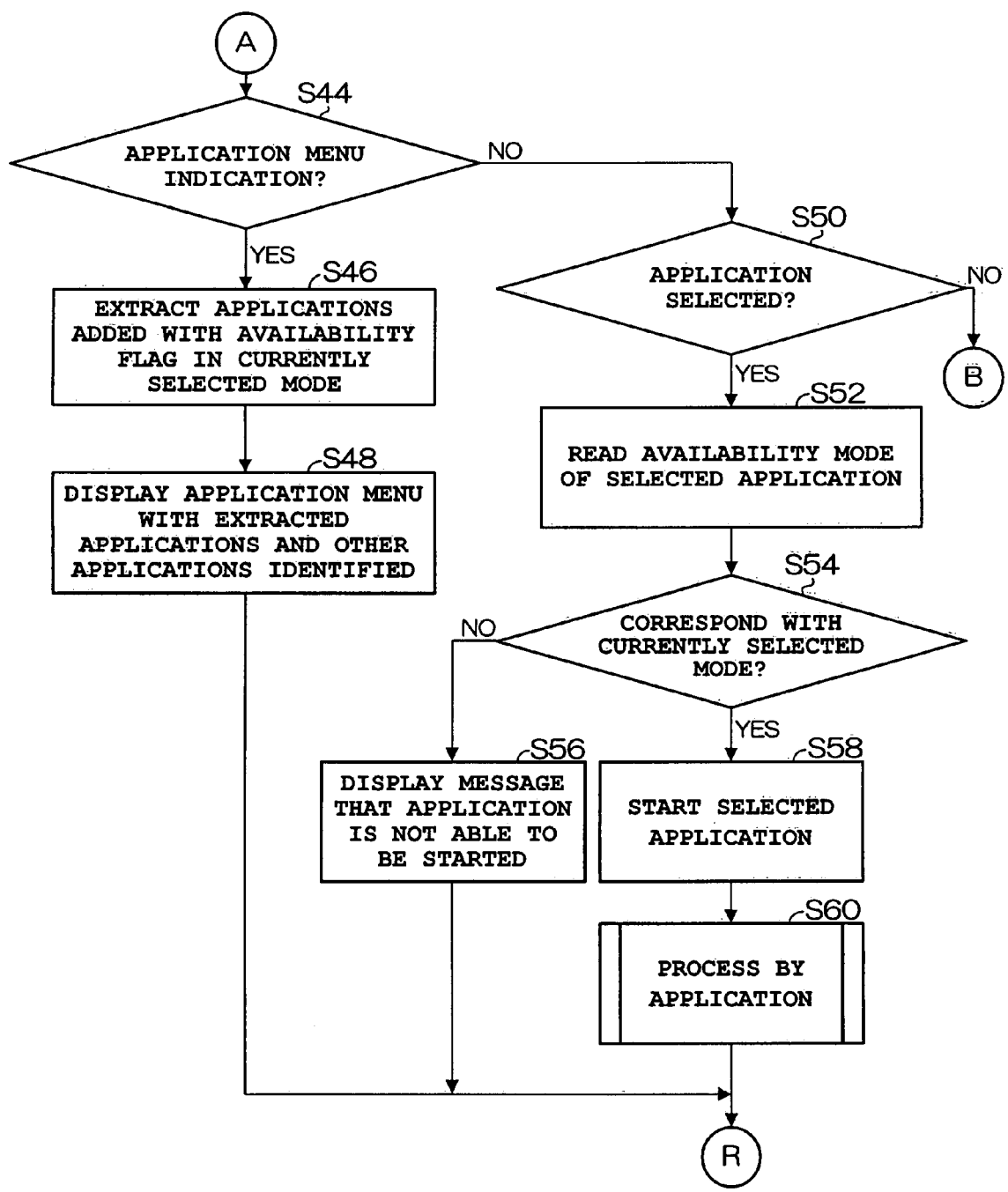
FIG. 6 is a flowchart for explaining operations of the cellular phone 100 according to this embodiment.
Figure 7:
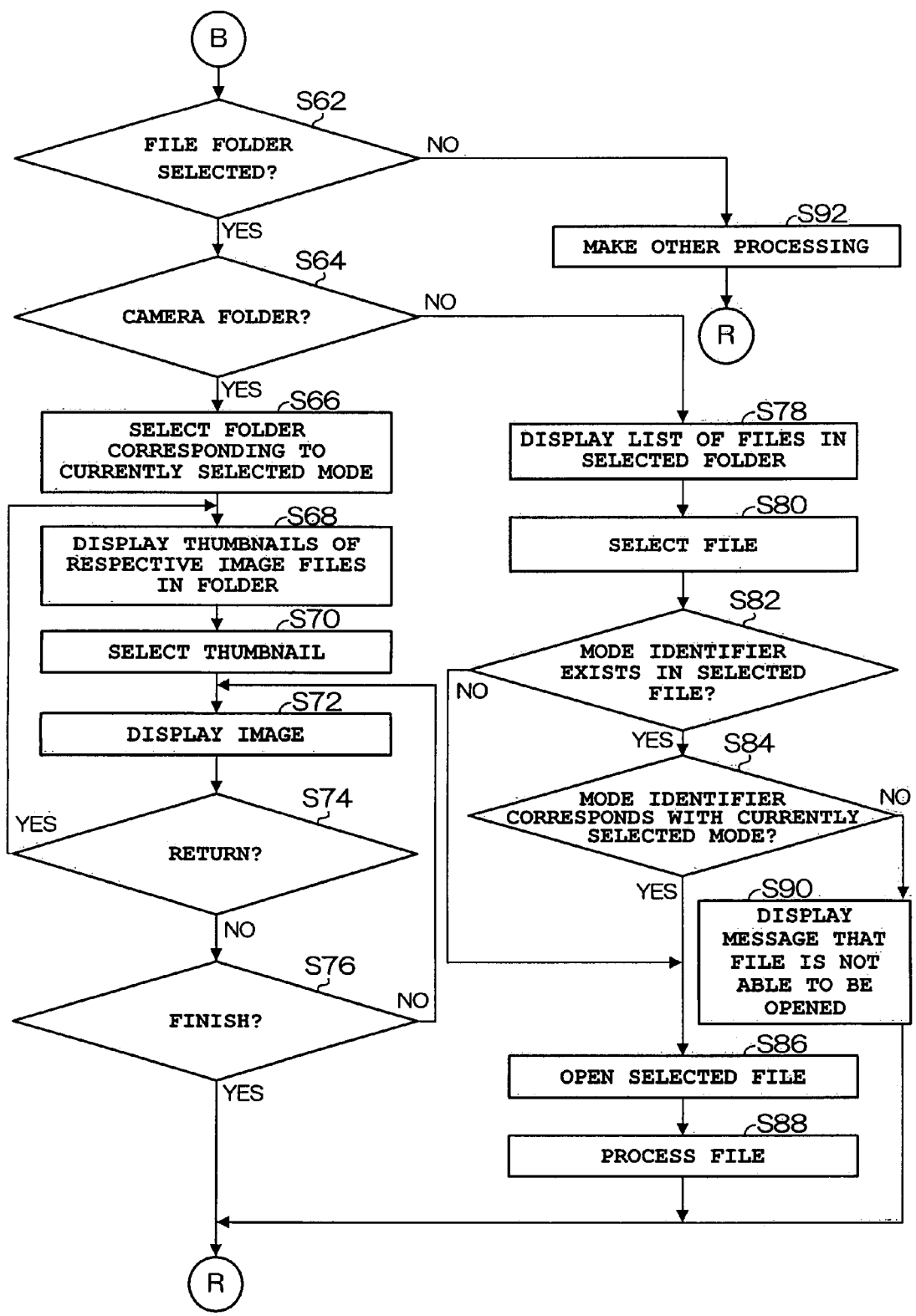
FIG. 7 is a flowchart for explaining operations of the cellular phone 100 according to this embodiment.

Next, main operations of the foregoing embodiment will be described. Here, FIGS. 5 to 7 are flowcharts for explaining operation of the cellular phone 100 according to this embodiment. First, the respective telephone numbers of the private mode and the official mode are read from the ROM 10 (Step S10). After the respective telephone numbers are registered, the cellular phone 100 is shifted to the idle state (Step S12). Next, the private mode is selected as default (Step S14), and determination is made whether or not an incoming call exists by the communication section 1 (Step S16).

When an incoming call exists in the telephone number of the private mode, usual incoming call addressing processing is made (Step S18). After that, telephone call processing is made by the communication section 1 (Step S24). Next, determination is made whether or not the telephone call is finished (Step S26). When the telephone call is not finished, the procedure is returned to Step S24, and the telephone call is continued. Meanwhile, when the telephone call is finished, the procedure is returned to Step S16, and again presence of an incoming call is determined by the communication section 1.

Meanwhile, when no incoming call exists, determination is made whether or not an outgoing call (operation) exists (Step S20). When an outgoing call (operation) exists, a call is originated by the telephone number corresponding to the currently selected telephone number mode (in this case, private mode) (Step S22). Next, when connected to other party, telephone call processing is made by the communication section 1 (Step S24). Next, determination is made whether or not the telephone call is finished (Step S26). When the telephone call is not finished, the procedure is returned to Step S24, and the telephone call is continued. Meanwhile, when the telephone call is finished, the procedure is returned to Step S16, and again presence of an incoming call is determined.

When both an incoming call and an outgoing call do not exist, determination is made whether or not the non-contact IC section 6 is started (Step S28). When the non-contact IC section 6 is started, determination is made whether or not a company ID is accepted (Step S30). When the company ID is accepted, determination is made whether or not a coming-to-the-office signal is detected (Step S32). When the coming-to-the-office signal is detected, the official mode is selected (Step 534), the procedure is returned to Step S16, and the foregoing processing is repeated.

Meanwhile, when the coming-to-the-office signal is not detected, determination is made whether or not a leaving-the-office signal is detected (Step S36). When the leaving-the-office signal is detected, the private mode is selected (Step S38), the procedure is returned to Step S16, and the foregoing processing is repeated. When the company ID is not accepted, other processing is performed as appropriate (Step S40), the procedure is returned to Step S16, and the foregoing processing is repeated.

When both an incoming call and an outgoing call by the communication section 1 do not exist, and when the non-contact IC section 6 is not started, determination is made whether or not any operation is made on the key operation section 4 (Step S42). When no operation is made, the procedure is returned to Step S16, and the foregoing processing is repeated. Meanwhile, when an operation is made, determination is made on whether or not the operation is for indicating the application menu (Step S44). When the operation is for indicating the application menu, applications added with the availability mode corresponding to the currently selected telephone number mode (private mode or official mode) are extracted (Step S46).

Next, the extracted applications and other applications are identified respectively. Then, as shown in FIG. 10A or FIG. 10B, the application menu is displayed on the display section 7 so that applications usable in the relevant telephone number mode and applications not usable in the relevant telephone number mode can be distinguished (Step S48). FIG. 10A shows the application menu displayed in the case of the official mode. In the illustration, applications according to the camera, the electronic money, the radio, and document creation are available, and applications according to browsers, mails, music reproduction, and TV reception are not available.

Further, FIG. 10B shows the application menu displayed in the case of the private mode. In the illustration, applications according to the camera, browsers, mails, music reproduction, TV reception, and the radio are available, and applications according to the electronic money and document creation are not available. In either case, the usable applications are normally displayed, and the applications not usable are shown in reversing display or in gray. After that, the procedure is returned to Step S16, and the foregoing processing is repeated.

Meanwhile, when no operation for indicating the application menu is made, determination is made whether or not operation for selecting the application is made (Step S50). When one application is selected from the application menu in a state that the application menu is displayed, the availability mode of the selected application is read (Step S52).

Next, determination is made whether or not the currently selected telephone number mode (private mode or official mode) corresponds with the availability mode of the foregoing application (Step S54). When the currently selected telephone number mode does not correspond with the availability mode, as shown in FIG. 10C, a message to notify that the application is not able to be started is displayed (Step S56). Then, the procedure is returned to Step S16, and the foregoing processing is repeated.

Meanwhile, when the currently selected telephone number mode (private mode or official mode) corresponds with the availability mode of the application, the selected application is started (Step S58), and processing by the application is made (Step S60). After that, the procedure is returned to Step S16, and the foregoing. processing is repeated. For an example of the processing by the application, the description will be given later.

When both an incoming call and an outgoing call do not exist, when the non-contact IC section 6 is not started, and when an operation other than the operation for indicating the application menu and the operation for selecting the application is made, determination is made whether or not an operation for selecting the file folder is made (Step S62). In general, the operation for selecting the file folder is made under the conditions that a selected application is previously started.

When the operation for selecting the file folder is made, determination is made whether or not the camera folder F1 is selected (Step S64). When the camera folder F1 is selected, a folder (private or official) corresponding to the currently selected telephone number mode (private mode or official mode) is selected (Step S66). That is, in the case of the official mode, the official folder F1-1 is selected. Meanwhile, in the case of the private mode, the private folder F1-2 is selected.

Next, thumbnails of respective image files in the selected folder are displayed (Step S68). Next, when the user selects one of the thumbnails (Step S70), an original image of the selected thumbnail is adjusted to the display size of the display section 7 and displayed (Step S72). When the image is displayed, determination is made whether or not a direction for returning is made by the user (Step S74). When the direction for returning is made, the procedure is returned to Step S68, the thumbnails in the folder are redisplayed, and then the foregoing processing of displaying the original image is made.

When no direction for returning is made, determination is made whether or not a direction for finishing is made (Step S76). When no direction for finishing is made, the procedure is returned to Step S72, and the original image is continuously displayed. Meanwhile, when the direction for finishing is made, displaying the image is finished, the procedure is returned to Step S16 shown in FIG. 5, and the foregoing processing is repeated.

Meanwhile, when a folder other than the camera folder is selected, a list of the files in the selected folder is displayed (Step S78). Next, when the user selects one file thereof (Step S80), determination is made whether or not the selected file has a mode identifier (Step S82). When the selected file has a mode identifier, determination is made whether or not the mode identifier corresponds with the currently selected telephone number mode (private mode or official mode) (Step S84).

When the both modes correspond with each other, the selected file is opened (Step 886), and the file is provided with given processing by the previously started application (Step S88). After that, when the application is finished, the procedure is returned to Step S16 shown in FIG. 5, and the foregoing processing is repeated.

Meanwhile, when the both modes do not correspond with each other, a message that the file is not able to be opened is displayed (Step S90), the procedure is returned to Step S16 shown in FIG. 5, and the foregoing processing is repeated. That is, when the telephone number mode is the private mode, only the private file can be opened and provided with processing, and the official file is not able to be opened and provided with processing. Similarly, when the telephone number mode is the official mode, only the official file can be opened and provided with processing, and the private file is not able to be opened and provided with processing.

When the selected file does not have a mode identifier, limitations are not particularly put thereon. Therefore, the selected file is directly opened (Step S86), and the file is provided with given processing (Step S88). After that, the procedure is returned to Step S16 shown in FIG. 5, and the foregoing processing is repeated.

Even when both an incoming call and an outgoing call do not exist, when the non-contact IC is not started, and when an operation other than the operation for indicating the application menu and the operation for selecting the application is made, in the case that a file folder is not selected, other processing is made as appropriate (Step S92). After that, when the application is finished, the procedure is returned to Step S16 shown in FIG. 5, and the foregoing processing is repeated.

B-2. Camera Application

Figure 8:
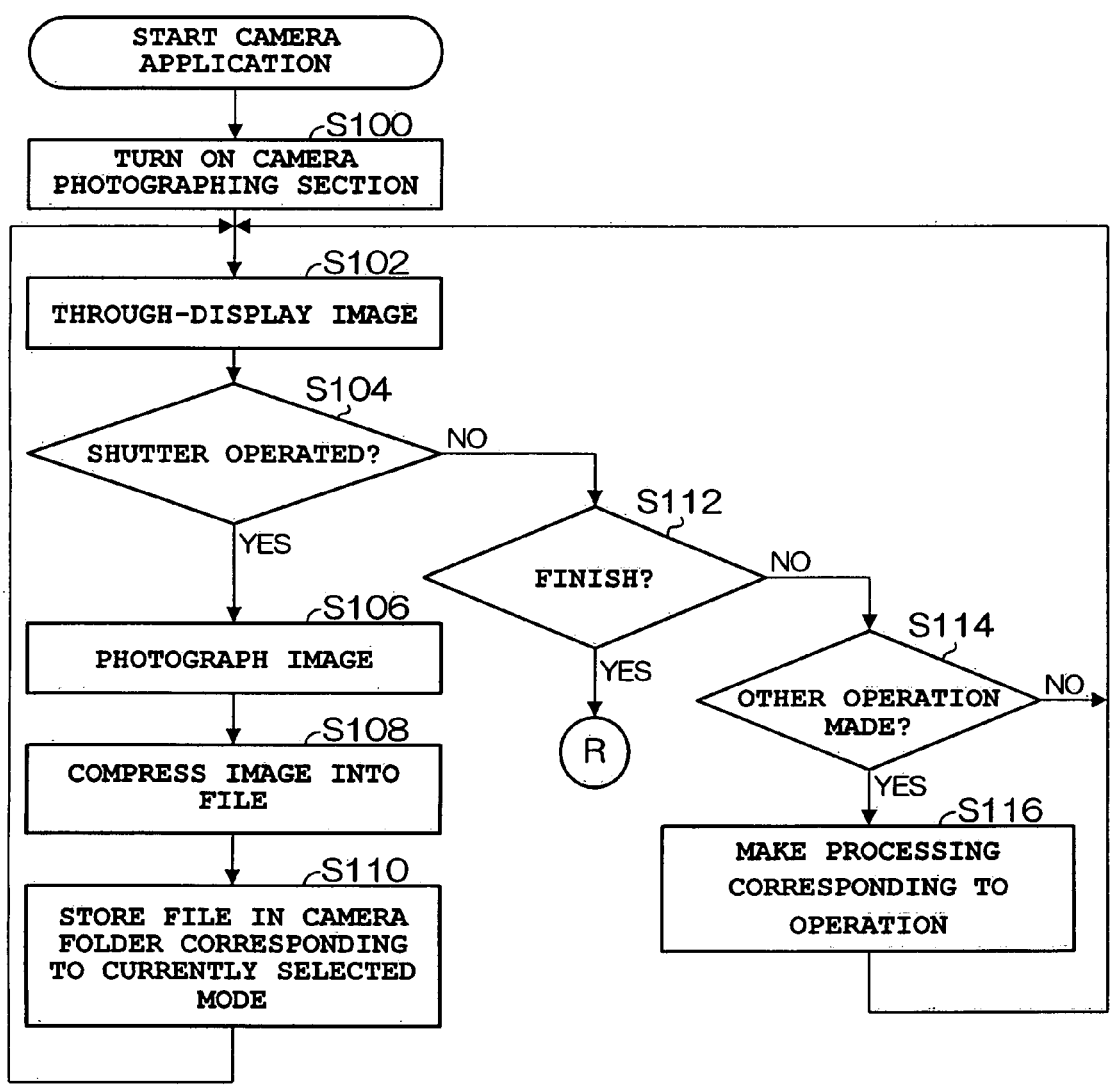
FIG. 8 is a flowchart for explaining operations of a camera application according to this embodiment.

Next, a description will be given of operations of a camera application of the cellular phone according to this embodiment. FIG. 8 is a flow chart for explaining the operations of the camera application according to this embodiment. When the camera application is started, first, the camera photographing section 3 is turned ON (Step S100), and an image photographed is through-displayed on the display section 7 (Step S102).

Next, determination is made whether or not a shutter of the key operation section 4 is operated (StepS104). When the shutter is operated, the image is photographed by the camera photographing section 3 (Step S106), the photographed image is compressed with a given format and formed into a file (Step S106), and the file is stored in the camera folder corresponding to the currently selected telephone number mode (official mode or private mode) (Step S110). That is, in the case of the official mode currently, the image data is stored in the official folder F1-1. In the case of the private mode, the image data is stored in the private folder F1-2.

When the shutter is not operated, determination is made whether or not finish operation is made by the key operation section 4 (Step S112). When the finish operation is made, the processing is finished. Then, the procedure is returned to Step S16 shown in FIG. 5, and the foregoing processing is repeated. Further, when both the shutter operation and the finish operation are not made, determination is made whether or not other operation is made (Step S114). When other operation is made, processing corresponding to the operation is made (Step S116). Then, the procedure is returned to Step S102, and processing on and after the through-display is continued. Meanwhile, when all of the shutter operation, the finish operation, and other operation are not made, no processing is made, the procedure is returned to Step S102, and processing on and after the through-display is continued.

B-3: Data Download

Figure 9:
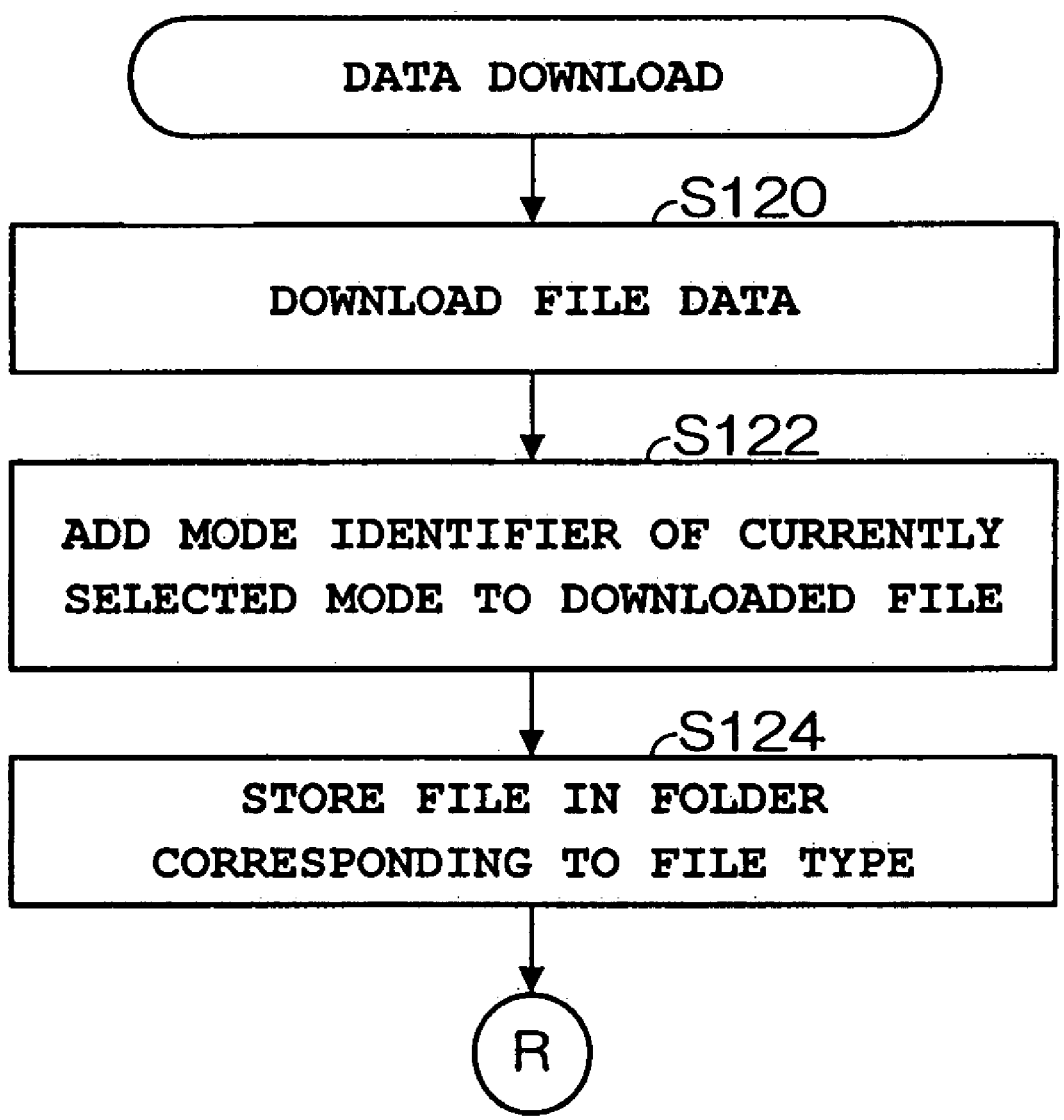
FIG. 9 is a flowchart for explaining operations of data download according to this embodiment.

Next, a description will be given of operations of data download of the cellular phone according to this embodiment. FIG. 9 is a flowchart for explaining the operations of the data download according to this embodiment. When an application of the data download is started, the communication section 1 is turned ON, and file data is downloaded from a given server or the like on the network (Step S120). Next, the downloaded file is added with a mode identifier of the currently selected telephone number mode (Step S122). That is, in the case of the private mode currently, the file is added with the private mode identifier. In the case of the official mode, the file is added with the official mode identifier. After that, the file is stored in the folder corresponding to the file type (music folder F2, document folder F3, moving image folder F4, static image folder F5. or the like) (Step S124).

According to the foregoing embodiment, the plurality of processing functions provided for the mobile terminal 100 are individually limited according to the currently selected telephone number mode for communication. Therefore, various processing functions provided for the mobile terminal 100 can be automatically used according to the selection state of the telephone number mode which is selectable between official use and private use.

Further, accessing the plurality of files stored in the mobile terminal 100 is individually limited according to the currently selected telephone number mode for communication. Therefore, many files stored in the mobile terminal 100 can be automatically used according to the selection state of the telephone number mode which is selectable between official use and private use.

In the foregoing embodiment, whether or not the application is usable in the currently selected telephone number mode is indicated according to the availability mode added for the application. However, the invention is not limited thereto, and it is possible that only the applications with no availability limitation in the telephone number mode selected at this point are extracted according to the availability mode added for the application, and the extracted applications are displayed as selectable processing functions. Thereby, other applications not extracted, that is, the applications not corresponding to the current telephone number mode are not displayed. Therefore, applications selectable by the user can become clearer.

Furthermore, although the computer program product of the mobile terminal which is a preferred embodiment of the present invention is stored in the memory (for example, ROM, etc.) of the mobile terminal, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A mobile terminal which stores a plurality of telephone numbers corresponding to a plurality of telephone number modes, and executes communication by a telephone number corresponding to a telephone number mode selected from the plurality of telephone number modes comprising:
   a telephone number mode selection means for selecting one of the plurality of telephone number modes;
   a plurality of processing means for executing given processing other than the communication with corresponding availability limitation information which indicates whether or not the processing is available according to each of the plurality of telephone number modes, wherein the given processing other than communication is at least one of a camera function, a browser function, an electronic money function, a music reproduction function, a television reception function, and a radio function; and
   an execution availability determination means for determining execution availability of each of the plurality of processing means based on the telephone number mode selected by the telephone number mode selection means and the availability limitation information corresponding to the plurality of processing means.

2. The mobile terminal according to claim 1, wherein the execution availability determination means determines execution availability of each of the plurality of processing means by determining presence of an availability limitation in relation to the telephone number mode selected by the telephone number mode selection means with reference to the availability limitation information corresponding to one of the plurality of processing means, when execution is directed to the one of the plurality of processing means, and prohibits executing the one of the plurality of processing means when the availability limitation exists.

3. The mobile terminal according to claim 1 comprising:
   a display means for displaying a list of the plurality of processing means so that each of the plurality of processing means can be selected; and
   a display control means for identifiably displaying the execution availability of each of the plurality of processing means as selection availability information indicating whether or not each processing means can be selected on the display means.

4. The mobile terminal according to claim 3, comprising:
   an extraction means for extracting a processing means with no availability limitations in the telephone number mode selected by the telephone number mode selection means from the plurality of processing means based on the execution availability determined by the execution availability determination means for each of the plurality of processing means, wherein
   the display control means displays the processing means extracted by the extraction means as a selectable processing means on the display means.

5. The mobile terminal according to claim 1, wherein the plurality of telephone number modes include official mode and private mode comprising:
   a detection means for detecting whether a user comes to the office or leaves the office by non-contact communication with an external terminal provided in the office; and
   a mode switch means for switching the telephone number mode to the official mode when the detection means detects that the user comes to the office, and switching the telephone number mode to the private mode when the detection means detects that the user leaves the office.

6. A mobile terminal which stores a plurality of telephone numbers corresponding to a plurality of telephone number modes, and executes communication by a telephone number corresponding to a telephone number mode selected from the plurality of telephone number modes comprising:
   a telephone number mode selection means for selecting one of the plurality of telephone number modes;
   a memory means for storing a plurality of data to be controlled corresponding to the one of the plurality of telephone number modes, wherein the plurality of data to be controlled relates to a camera function, a browser function, an electronic money function, a music reproduction function, a television reception function, or a radio function; and
   an accessibility determination means for determining accessibility to each of the plurality of data to be controlled based on whether or not a telephone number mode corresponding to each of the plurality of data to be controlled corresponds with the telephone number mode selected by the telephone number mode selection means.

7. The mobile terminal according to claim 6 comprising:
   a mode matching means for matching a telephone number mode selected at this point with each of the plurality of data when the plurality of data is stored in the memory means, wherein
   the accessibility determination means admits accessing to designated data when one of the plurality of data stored in the memory portion is designated, in the case that the telephone number mode corresponding to the designated data corresponds with the telephone number mode selected by the telephone number mode selection means.

8. The mobile terminal according to claim 6, wherein the accessibility determination means prohibits accessing to designated data when one of the plurality of data stored in the memory portion is designated, in the case that the telephone number mode corresponding to the designated data does not correspond with the telephone number mode selected by the telephone number mode selection means.

9. A non-transitory computer-readable recording medium storing an operation control program executed by a processor in a mobile terminal, the operation control program comprising:
- a telephone number mode selection function for selecting one of a plurality of telephone number modes corresponding to a plurality of telephone numbers;
- a plurality of processing functions for executing given processing other than communication with corresponding availability limitation information which indicates whether or not the processing is available according to each of the plurality of telephone number modes, wherein the given processing other than communication is at least one of a camera function, a browser function, an electronic money function, a music reproduction function, a television reception function, and a radio function; and
- an execution availability determination function for determining execution availability of each of the plurality of processing functions based on the telephone number mode selected by the telephone number mode selection function and the availability limitation information corresponding to the plurality of processing functions.

10. A non-transitory computer-readable recording medium storing a data access control program executed by a processor in a mobile terminal, the data access control program comprising:
- a telephone number mode selection function for selecting one of a plurality of telephone number modes corresponding to a plurality of telephone numbers;
- a matching function for matching each of a plurality of data to be controlled with the one of the plurality of telephone number modes, wherein the plurality of data to be controlled relate to a camera function, a browser function, an electronic money function, a music reproduction function, a television reception function, or a radio function; and
- an accessibility determination function for determining accessibility to each of the plurality of data to be controlled based on whether or not the telephone number mode corresponding to each of the plurality of data to be controlled corresponds with the telephone number mode selected by the telephone number mode selection function.

* * * * *